United States Patent
Abe

[11] Patent Number: 4,556,137
[45] Date of Patent: Dec. 3, 1985

[54] CLUTCH CLEARANCE UNIFORMING DEVICE

[75] Inventor: Minoru Abe, Katano, Japan

[73] Assignee: Kabushiki Kaisha Daikin Seisakusho, Neyagawa, Japan

[21] Appl. No.: 551,795

[22] Filed: Nov. 15, 1983

[30] Foreign Application Priority Data
Nov. 15, 1982 [JP] Japan .................. 57-173456[U]

[51] Int. Cl.$^4$ ............................................. F16D 13/75
[52] U.S. Cl. ............................. 192/111 A; 192/30 W
[58] Field of Search .............. 192/85 C, 111 A, 70.25, 192/30 W

[56] References Cited
U.S. PATENT DOCUMENTS

| | | | |
|---|---|---|---|
| 2,341,587 | 2/1944 | Andres et al. | 192/85 C |
| 2,421,869 | 6/1947 | Brock | 192/111 A |
| 2,593,192 | 4/1952 | Rockwell | 192/111 A |
| 3,171,526 | 3/1965 | Waclawek | 192/111 A |
| 3,430,744 | 3/1969 | Oguri | 192/111 A |
| 3,430,745 | 3/1969 | Randol | 192/111 A |
| 3,468,405 | 9/1969 | Gardner et al. | 192/111 A |
| 3,489,257 | 1/1970 | Nakano | 192/111 A |
| 3,765,522 | 10/1973 | Dahlkuist et al. | 192/111 A |
| 3,946,845 | 3/1976 | Kamio | 192/111 A |

FOREIGN PATENT DOCUMENTS
2035065 1/1972 Fed. Rep. of Germany ... 192/111 A

Primary Examiner—Ira S. Lazarus
Attorney, Agent, or Firm—Armstrong, Nikaido, Marmelstein & Kubovcik

[57] ABSTRACT

This invention relates to the clutch clearance uniforming device having the piston 21 fitted freely slidingly in the slave cylinder 1, the annular holder plate 22 contacting with the open end surface of said slave cylinder 1, the sleeve 23 fitted in the central hole of said holder plate 22 and slidable relatively to the slave cylinder 1 by the fixed distance in the axial direction, the first release rod 27 fitted into said sleeve 23 and one end thereof pressing on said piston 21, the second release rod 28 fitted likewise into said sleeve 23 and slidable relatively to said first release rod 27 by the fixed distance, the compression spring 30 interposed between the pair of said release rods 27, 28, and the lock ball 29 integrating the sleeve 23 and the pair of release rods 27, 28 by means of elastic force of said spring 30 at the time when said compression spring 30 stretches; characterized by that the stopper (31) for preventing the lock ball 29 from slipping out of the sleeve 23 is provided on said first release rod 27, and at the same time, the spring 33 for holding the position of the holder plate 22 is provided on the second release rod 28.

4 Claims, 5 Drawing Figures

CLUTCH CLEARANCE UNIFORMING DEVICE

BACKGROUND AND SUMMARY OF THE INVENTION

The present invention relates to an improvement of a device for always making uniform a clutch clearance of a hydraulic clutch employed, for example, in vehicles.

FIG. 1 is a layout drawing showing a position to which this invention is applied, and the clutch clearance uniforming device according to this invention is assembled in a slave cylinder 1. 2 is a pipe connecting the slave cylinder 1 and a master cylinder 3. A piston 4 in the master cylinder 3 is interconnected through a rod 5 and a pin 6 to a clutch pedal 7, and the pedal 7 is supported by a vehicle body through a pin 8 freely rotatably. 9 is a boot equipped to the slave cylinder 1. 28 is a second release rod, 13 is a release york supported by a fixed supporting point 12. The second release rod 28 interconnects the slave cylinder 1 to the release york 13. A clutch thrust bearing 14 is rotatably connected through a pin to the tip end of the release york 13, and faces to a release lever 15 with a clutch clearance $l_1$ kept therebetween at the time of normal clutch engagement. The number 16 indicates a return spring.

In a conventional hydraulically-operated type clutch which does not incorporate a clutch clearance uniforming device, there are disadvantages not only that the release lever 15 inclines as a clutch facing (not shown) is worn out at the time of clutch engagement and the clutch clearance $l_1$ gradually decreases to change operation feeling of the pedal 7 at the time of disengaging the clutch, but that slipping of the clutch and worn out of the thrust bearing etc. occur.

In order to avoid the above-mentioned disadvantages, the applicant of this invention already proposed the clutch clearance uniforming device as shown in FIG. 2 (Utility model publication 52-14827). In the clutch clearance uniforming device shown in FIG. 2, however, there was the possibility that lock balls 20 for integrating a sleeve 17, push bar 18, and push rod 19 incorporated in a slave cylinder 1' and working cooperatively each other slipped out of the sleeve 17 due to an axial over-stroke of the push rod 19 produced at the time of clutch operation to cause disassembly and disordered function of said clearance uniforming device. Further, the clearance may disperse due to loosening of a holder plate 22 which was held by a boot.

Accordingly it is an object of the present invention to provide a highly reliable construction which can be attached to a slave cylinder of any kind of vehicles, produces a correct clearance, and securely prevents disassembling and other troubles during operation.

The essence of the invention is to provide a stopper for preventing a lock ball from slipping out of a sleeve, and to provide a spring for holding a position of a holder plate.

Other and further objects, features and advantages of the invention will appear more fully from the following description of the preferred embodiments of the invention.

DETAILED DESCRIPTION OF THE PREFERRED EMBODIMENT

Figure 3:
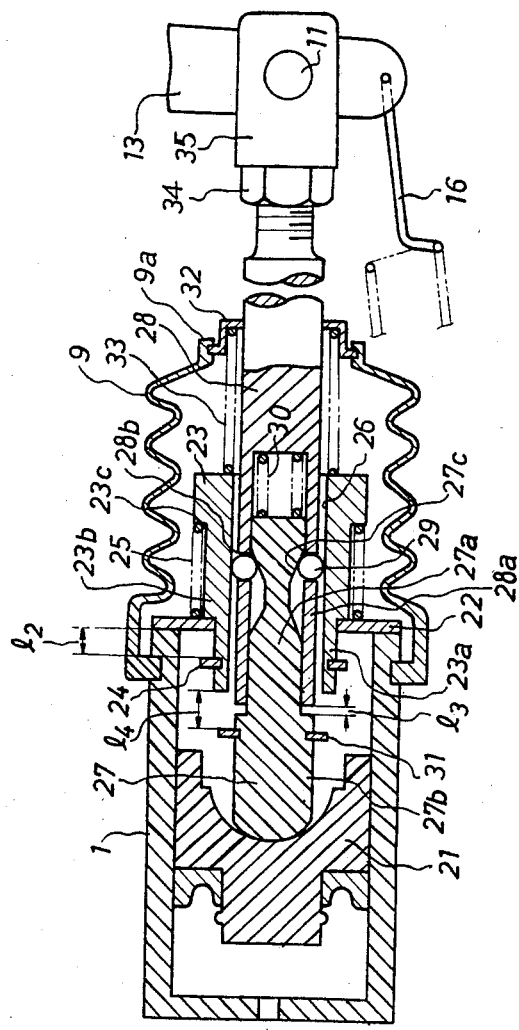
FIG. 3 is a sectional view of a slave cylinder employing a first embodiment of the invention.

FIG. 3 is a vertical sectional side view of a cylinder portion at the time of clutch engagement, in which a piston 21 fits in the cylinder 1 freely slidingly. 22 is an annular holder plate contacting with an open end surface of the slave cylinder 1 by being forcibly pressed with springs 25, 33 as described below. A small-dia. portion 23a of a sleeve 23 fits in a central hole of the holder plate 22 from an outside of the slave cylinder 1 (from the right side of the figure) and is slidable by a distance $l_2$ owing to a snap ring 24. This distance $l_2$ corresponds to the clutch clearance $l_1$ as described below. On a large-dia. portion 23b of the sleeve 23, a spring 25 weaker than the return spring 16 is compressively interposed between a shouldered portion 23c and the holder plate 22. Rails 26 respectively having arc sections are provided at three spots on an inner surface of the sleeve 23.

27, 28 are a pair of release rods, a small-dia. portion 27a of a first release rod 27, a front end (the left end of the figure) of which presses on a piston 21, fits into a cylindrical portion 28a of a second release rod 28, and a slight clearance $l_3$ is provided between a large-dia. portion 27b of the first release rod 27 and a front end of the cylindrical portion 28a. Lock balls 29 fit in a hole 28b of the cylindrical portions 28a at parts facing on the rail 26, and compressively contacts on a tapered portion 27c becoming slender in the direction of the front of the first release rod 27. 30 is a compression spring disposed in between both the release rods 27, 28, and stronger than the return spring 16. The first release rod 27 is forcibly pressed foreward (the left side of the figure) by this spring 30 to cause wedging of the lock ball 29 in between the rail 26 and the tapered portion 27c. For this reason, the sleeve 23 and the pair of the release rods 27, 28 are integrated together. 31 is a snap ring having an external diameter larger than an internal diameter of the sleeve 23, and fits in an annular groove on the large-dia. portion 27b of the first release rod 27. This snap ring 31 is a part which defines the rearward displacement of the pair of release rods 27, 28 to prevent the lock ball 29 from slipping out of the sleeve 23 and much more improves reliability of the clutch clearance uniforming device according to this invention. An annular spring receiver 32 is welded to the second release rod 28, and a spring 33 weaker than the return spring 16 is compressively provided between the sleeve 23 and this spring receiver 32. The foreward end of the boot 9 elastically fits onto a vicinity of an open end of the slave cylinder 1, and a groove 9a at the rearward end thereof fits onto the spring receiver 32. A reference number 34 indicates a lock nut and 35 is a connector, and a length of the second release rod 28 can be adjusted by loosening the lock nut 34.

Figure 1:
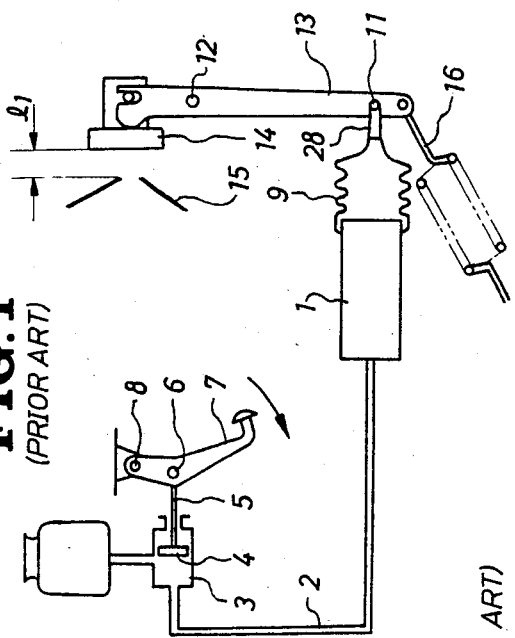
FIG. 1 is a schematic layout view of an operation mechanism of a hydraulic clutch.

In case of disengaging the clutch, when the pedal 7 (FIG. 1) is stepped in the direction of the arrow, hydraulic pressure in the master cylinder 3 is applied to the piston 21 in the slave cylinder 1 (FIG. 3) and the piston is pushed rearward (the right side of the figure). In this instance the sleeve 23 and the pair of release rods 27, 28 integrally slide rearward by the distance $l_2$ against the elastic force of the return spring 16 with the ball 29 kept under locked condition because the compression spring 30 is stronger than the return spring 16. The distance $l_2$ is so set that the clearance $l_1$ becomes zero when the distance $l_2$ becomes zero.

When the thrust bearing 14 contacts with the release lever 15 and receives a load in the next stage, the compression spring 30 (FIG. 3) also receives a load and deflects to cause release of the locked condition of the ball 29. Only the first release rod 27 slides rearward by the distance $l_3$ to permit the large-dia. portion 27b contact with the foreward end of the cylindrical portion 28a of the second release rod 28. Then, both the release rods 27, 28 integrate each other and slide rearward with the sleeve 23 left thereat to cause disengagement of the clutch. A clearance $l_4$ between the snap ring 31 and the sleeve 23 at the time of clutch engagement is set within such a range that the lock balls 29 does not slip out of the sleeve 23 when the clutch is disengaged.

When the clutch is engaged, both the release rods 27, 28 move foreward with the locking of the balls 29 kept released, and the compression spring 30 repulses immediately before the thrust bearing 14 leaves the release lever 15 to permit only the first release rod 27 slide foreward by the distance $l_3$ to lock the balls 29, thus the sleeve 23 and the release rods 27, 28 becoming integrated. And the return spring 16 successively actuates and provides the clearance $l_2$ to produce the fixed clutch clearance $l_1$ between the thrust bearing 14 and the release lever 15. With an increase in wear of the clutch disc facing, the engaging position of lock balls 29 relative to the sleeve 23 at the time of clutch engagement shifts foreward. However, the clutch clearance $l_1$ remains constant since the return spring always continues to produce the fixed clearance $l_2$.

As described above, this invention relates to the clutch clearance uniforming device having the piston 21 fitted freely slidingly in the slave cylinder 1, the annular holder plate 22 contacting with the open end surface of said slave cylinder 1, the sleeve 23 fitted in the central hole of said holder plate 22 and slidable relatively to the slave cylinder 1 by the fixed distance in the axial direction, the first release rod 27 fitted into said sleeve 23 and one end thereof pressing on said piston 21, the second release rod 28 fitted likewise into said sleeve 23 and slidable relatively to said first release rod 27 by the fixed distance, the compression spring 30 interposed between the pair of said release rods 27, 28, and the lock ball 29 integrating the sleeve 23 and the pair of release rods 27, 28 by means of elastic force of said spring 30 at the time when said compression spring 30 stretches; characterized by that the stopper (31) for preventing the lock ball 29 from slipping out of the sleeve 23 is provided on said first release rod 27, and at the same time, the spring 33 for holding the position of the holder plate 22 is provided on the second release rod 28. Effects of the present invention are listed as follows:

(a) The clutch clearance $l_1$ of the hydraulically-operated type clutch can be always maintained constant.

(b) It can be securely avoided that the lock balls 29 slip out of the sleeve to cause disassembly of the clearance uniforming device. Further, since there is no possibility of the lock ball 29 slipping out, it is not required to provide an allowance for the axial length of the sleeve 23 so that the overall length can be made shorter than a conventional one.

(c) An assembled body of the holder plate 22, the sleeve 23, and the pair of the release rods 27, 28 etc. can be easily removed from the slave cylinder 1, so that such the assembled body can be easily attached to each kind of vehicle already delivered by supplying it as a set.

Figure 2:
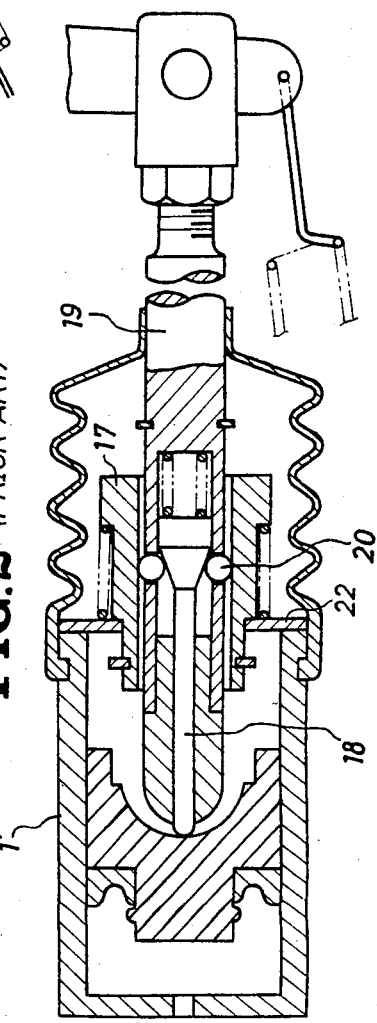
FIG. 2 is a sectional partial view of a conventional slave cylinder.

(d) The holder plate 22 is held at the open end surface of the slave cylinder 1 by depressing it with the springs 25, 33, so that an accuracy of the clearance $l_1$ is improved because the position of the holder plate 22 is stable as compared, for example, with the device shown in FIG. 2 wherein the holder plate is held by the inner surface of the boot.

Figure 4:
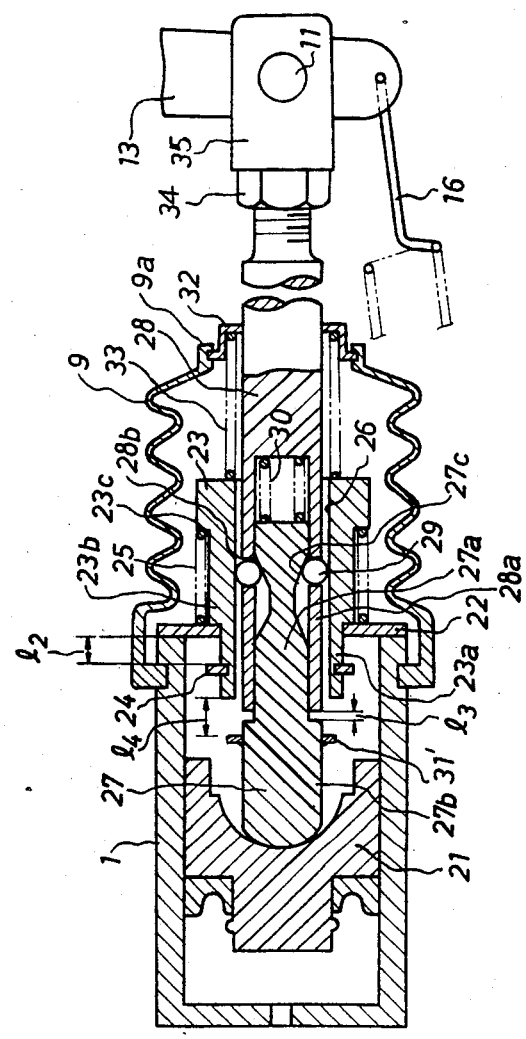
FIG. 4 is a sectional view of a slave cylinder employing a second embodiment of the invention.
Figure 5:
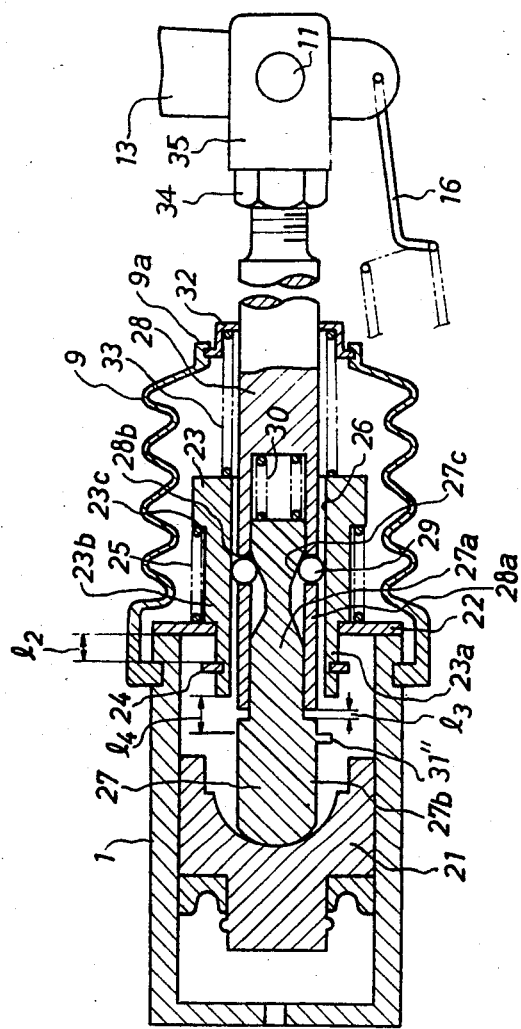
FIG. 5 is a sectional view of a slave cylinder employing a third embodiment of the invention.

When embodying the present invention, various shapes such as a ring 31' welded on the first release rod 27 (FIG. 4) or a projection 31" provided integrally on the first release rod 27 (FIG. 5) may be considered for the stopper which defines the rearward displacement of the release rods 27, 28.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed is:

1. A clutch clearance uniforming device having a piston fitted freely slidingly in a slave cylinder, an annular holder plate contacting with an open end surface of said slave cylinder, a sleeve fitted in a central hole of said holder plate and slidable relatively to the slave cylinder by a fixed distance in the axial direction, a first release rod fitted into said sleeve and one end thereof pressing on said piston, a second release rod fitted likewise into said sleeve and slidable relatively to said first release rod, a compression spring interposed between a pair of said release rods, and a lock ball integrating the sleeve and the pair of release rods by means of elastic force of said spring at the time when said compression spring stretches; charactarized by that a stopper for preventing the lock ball from slipping out of the sleeve is provided on said first release rod, and at the same time a spring for holding the position of the holder plate is provided on the second release rod.

2. A clutch clearance uniforming device of claim 1 wherein said stopper is a snap ring fitted in an annular groove on the first release rod.

3. A clutch clearance uniforming device of claim 1 wherein said stopper is a ring welded on the first release rod.

4. A clutch clearance uniforming device of claim 1 wherein said stopper is a projection formed integrally with the first release rod.

* * * * *